(12) United States Patent
Tu

(10) Patent No.: US 11,118,979 B2
(45) Date of Patent: Sep. 14, 2021

(54) VACUUM PACKAGED INFRARED SENSOR ARRAYS

(71) Applicant: Xiang Zheng Tu, San Jose, CA (US)

(72) Inventor: Xiang Zheng Tu, San Jose, CA (US)

(\*) Notice: Subject to any disclaimer, the term of this patent is extended or adjusted under 35 U.S.C. 154(b) by 149 days.

(21) Appl. No.: 16/571,193

(22) Filed: Sep. 16, 2019

(65) Prior Publication Data

US 2021/0080327 A1    Mar. 18, 2021

(51) Int. Cl.
*G01J 5/04* (2006.01)
*G01J 5/02* (2006.01)
*G01J 5/08* (2006.01)

(52) U.S. Cl.
CPC .............. *G01J 5/045* (2013.01); *G01J 5/0225* (2013.01); *G01J 5/0806* (2013.01)

(58) Field of Classification Search
CPC .................................... G01J 5/12; H01L 35/34
See application file for complete search history.

(56) References Cited

U.S. PATENT DOCUMENTS

2005/0026321 A1\*    2/2005   D'Arrigo et al. ... B81C 1/00142
                                                   438/53

\* cited by examiner

*Primary Examiner* — Yara B Green
(74) *Attorney, Agent, or Firm* — JW Law Group; James M. Wu

(57) ABSTRACT

A vacuum packaged infrared sensor array with excellent performances is described. The individual pixel of the infrared sensor array has a thermopile made of recrystallized amorphous silicon resulting in low resistance, low thermal noise, high integration and high sensitivity. The vacuum in the packaged infrared sensor array is enhanced by low temperature oxidization of a porous silicon layer formed in a lid silicon substrate which is bonded with the infrared sensor array silicon substrate. The driving force for lowering oxidization temperature is reduction in surface energy of porous silicon. It has been reported that the surface energy is 0.0001 J/cm$^2$ for porous silicon and 0.2 J/cm$^2$ for planar crystal silicon.

19 Claims, 15 Drawing Sheets

VACUUM PACKAGED INFRARED SENSOR ARRAYS

FIELD OF THE DISCLOSURE

This invention relates to a vacuum packaged infrared sensor array and, more particularly, to a vacuum packaged infrared sensor array wherein the infrared sensor array has a thermopile made of recrystallized amorphous silicon and the vacuum is enhanced by low temperature oxidization of porous silicon.

BACKGROUND

Significant progress has been made on infrared sensor array technologies and production capabilities. The detector pixel dimensions have continually decreased with an increase in pixel performance making large format, high-density array products affordable. In turn, this has resulted in the proliferation of IR detectors in commercial and military markets. Presently, infrared detectors are widely used in firefighting, surveillance, industrial process monitoring, machine vision, and medical applications. Within the military arena, infrared detectors are ubiquitous in Army soldier systems such as weapon sights, driver's viewers, and helmet-mounted sights. Infrared detectors are also employed in airborne and ground surveillance sensors including unmanned aerial vehicles and robot vehicles.

Infrared thermopile sensors and arrays are sufficiently known in various forms and designs. Thermopile sensors produced using silicon micromachining on a substrate normally consist of a thin membrane, on which thermocouples produced using thin-film technology are situated. Situated below the membrane there is a hollow in the substrate, said hollow being surrounded by a silicon edge. Thermocouples in the form of elongated thermopile elements have hot contacts at one end and cold contacts at the other end, which are connected to one another by conductive tracks, wherein the hot contacts are situated on or in the central part of the membrane and the cold contacts are situated on the silicon edge, which serves as a heat sink.

Various structures for infrared thermopile sensor arrays were proposed and developed. U.S. Pat. No. 10,128,302 reveals an infrared detector array device comprising a dielectric membrane, supported by a substrate, the membrane having an array of IR detectors, where the array size is at least 3 by 3 or larger, and there are tracks embedded within the membrane layers to separate each element of the array, the tracks also acting as heat sinks and/or cold junction regions.

Uncooled thermal infrared sensors require to be operated in an ambient gas pressure of about 50 mTorr or less to avoid sensitivity being reduced by thermal conduction through the gas.

U.S. Pat. No. 5,701,008 reveals an integrated infrared microlens and gas molecule getter grating in a vacuum package, wherein the array has a plurality of microlenses aligned with respective IR detector array pixels to focus incoming IR radiation onto the pixels to improve the efficiency of IR detection, and a gas molecule getter grating inside a vacuum-sealed Dewar assembly that houses the detector array increases the surface area of the getter to improve the efficiency of removing residual gas molecules from the Dewar assembly.

U.S. Pat. App. 20180335347 reveals a thermal infrared sensor array in substrate-level package, wherein the array in a substrate-level package includes mechanics, comprising a heat-isolating cavity in a silicon substrate surrounded by a silicon edge, and a thin membrane connected to the silicone edge by of thin beams. The cavity extends through the silicon substrate to the membrane, and there are slots between the membrane, the beams and the silicon edge. A plurality of infrared-sensitive individual pixels are arranged in lines or arrays and are designed in a CMOS stack in a dielectric layer, forming the membrane, and are arranged between at least one cover substrate which is designed in the form of a cap and has a cavity and a base substrate. The cover substrate, the silicon substrate and the base substrate are connected to one another in a vacuum-tight manner and enclosing a gas vacuum.

In spite of successful commercialization of infrared thermopile sensor arrays, the infrared community is still searching for a platform for thermal imagers that combine affordability, convenience of operation, and excellent performance.

In response to these needs, the present invention provides a vacuum packaged infrared sensor array wherein the infrared sensor array has a thermopile made of recrystallized amorphous silicon and the vacuum in the package is enhanced by low temperature oxidization of porous silicon incorporated in the vacuum packaged infrared sensor array.

SUMMARY OF THE DISCLOSURE

In view of the forgoing background of the invention, the infrared imaging sensor has to be maintained at a certain degree of vacuum so as to ensure the normal operation. The conventional packaging method of the infrared imaging sensor not only has complicated process, but also the allocation amount of its getter is restricted by the size, of the vacuuming pipe, thus resulting in a bottleneck for maintaining the degree of vacuum state in the infrared imaging sensor.

An object of the present invention is to provide a vacuum packaged infrared sensor array with higher performances wherein the individual pixel of the infrared sensor array has a thermopile made of recrystallized amorphous silicon resulting in low resistance, low thermal noise, high integration and high sensitivity and the vacuum in the packaged infrared sensor array is enhanced by low temperature oxidization of the porous silicon layer formed in a lid silicon substrate which is bonded with the infrared sensor array silicon substrate.

Another object of the present invention is to provide a vacuum packaged infrared sensor array wherein the individual pixel of the infrared sensor array comprises a flat bottom and deeper cavity created in a silicon substrate by using a micromachining technology based on selectively forming and etching of porous silicon in the silicon substrate.

Still another object of the present invention is to provide a vacuum packaged infrared sensor array which can be fabricated using any crystal orientation silicon substrates including (111) crystal orientation silicon substrates and get rid of many restrictions to KOH based micromachining technology.

Still another object of the present invention is to provide a vacuum packaged infrared sensor array wherein the infrared sensor array has an infrared absorber created by a stack layer consisting of several CMOS comparable thin layer materials including titanium or a tungsten layer.

Still another object of the present invention is to provide a vacuum packaged infrared sensor array wherein the thermopile is combined with a recrystallized amorphous silicon field effect transistor in each pixel of the infrared sensor array so as to switch on/off the operated pixel and isolate the other pixels.

BRIEF DESCRIPTION OF THE FIGURES

The above and other features and advantages of the present invention will become more apparent by describing, example embodiments in detail with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

The present invention is further described below with reference to the accompanying drawings.

Figure 1:
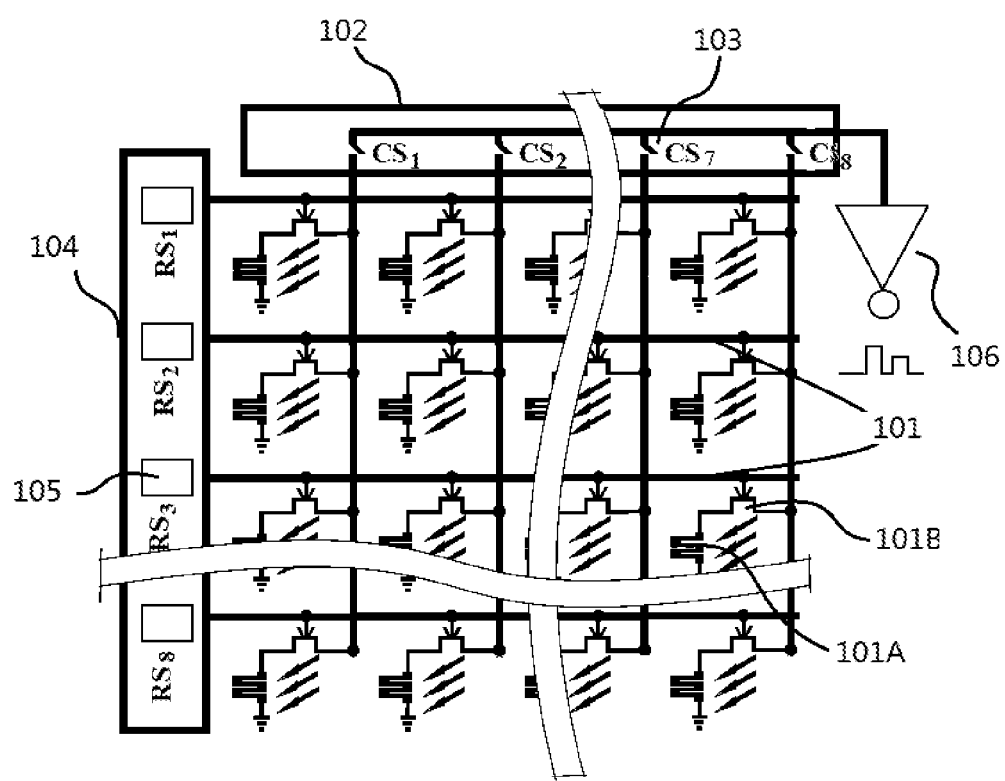
FIG. 1 shows a schematic driver circuit for a vacuum packaged infrared sensor array.

Reference to the FIG. 1, it shows a schematic infrared sensor array circuit diagram, wherein 101 indicates an infrared sensor pixel, 101A indicates a thermopile, 101B indicates a thin film field effect transistor (FET), 102 indicates a column decoder, 103 indicates a column switch, 104 indicates a row decoder, 105 indicates a row switch, and 106 indicates a preamplifier.

The matrix size of the infrared sensor array is large enough, such as 8×8, the array with a microcontroller can detect the presence of warm bodies in a room—as long as those bodies are moving up, down, left, right and diagonally. It can even detect multiple people or objects as they move in different directions. They can also sense an object's proximity to the detector and handle simple gesture control tasks.

Figure 2:
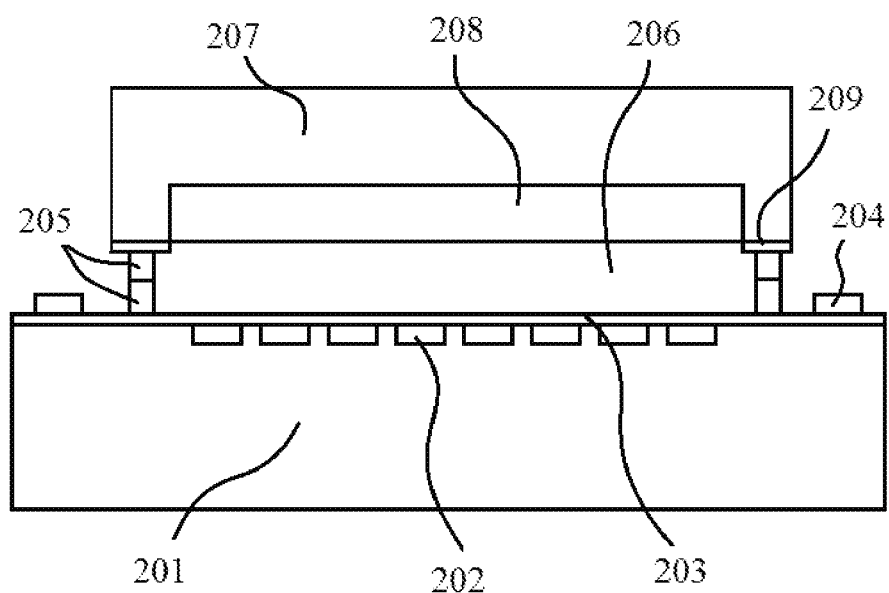
FIG. 2 shows a cross sectional view of the said vacuum packaged infrared sensor array.

According to the present invention, an across sectional view of the said vacuum packaged infrared sensor array can be shown in the FIG. 2. In the FIG. 2, 201 indicates an infrared sensor array silicon substrate, 202 indicates a pixel of an infrared sensor array, 203 indicates a silicon nitride layer on the said infrared sensor array silicon substrate, 204 indicates a bond pad connecting to the said infrared sensor array, 205 indicates a bonded eutectic ring, 206 indicates an enhanced vacuum in the chamber sandwiched between two bonded silicon substrates and sealed by the said eutectic ring, 207 indicates a lid silicon substrate, 208 indicates a low temperature oxidized porous silicon layer formed in the said lid silicon substrate, 209 indicates a silicon nitride layer on the said lid silicon substrate.

The low temperature oxidized porous silicon layer is formed by anodization of the lid silicon substrate in a HF solution. Before bonding, the lid silicon substrate with the porous silicon layer is thermal treated by heating up to 350° C. in a vacuum system for 30 to 60 min in order to desorb and remove Si—H species on the pore walls of the porous silicon layer.

After loading into a vacuum bonding system, the lid silicon substrate with the porous silicon layer is to pump from atmosphere to vacuum and then fill oxygen from vacuum to atmosphere for 2 to 3 times so that the residual gas in the pores of the porous silicon layer is no nitrogen and hydrogen and only oxygen.

In the vacuum bonding system, the infrared sensor array silicon substrate and the lid silicon substrate are bonded together by aligning, compacting, and then heating the eutectic ring up to 350 to 450° C. for 30 to 60 min to form a continuous thin oxide layer on the pore walls of the porous silicon layer which led to consume the residual oxygen in the sealed chamber and to increases the vacuum in the sealed chamber between the infrared sensor array silicon substrate and the lid silicon substrate.

Low temperature oxidization of porous silicon is benefited from its large surface area. The surface area of porous silicon is million times greater that of a planar surface crystal silicon which significantly lowers its oxidization temperature. The driving force for lowering the oxidization temperature is a reduction in surface energy of porous silicon. It has been reported that the surface energy is 0.0001 J/cm$^2$ for porous silicon and 0.2 J/cm$^2$ for planar crystal silicon. So large surface area makes porous silicon chemically unstable, and its oxidization is common natural process.

Figure 3:
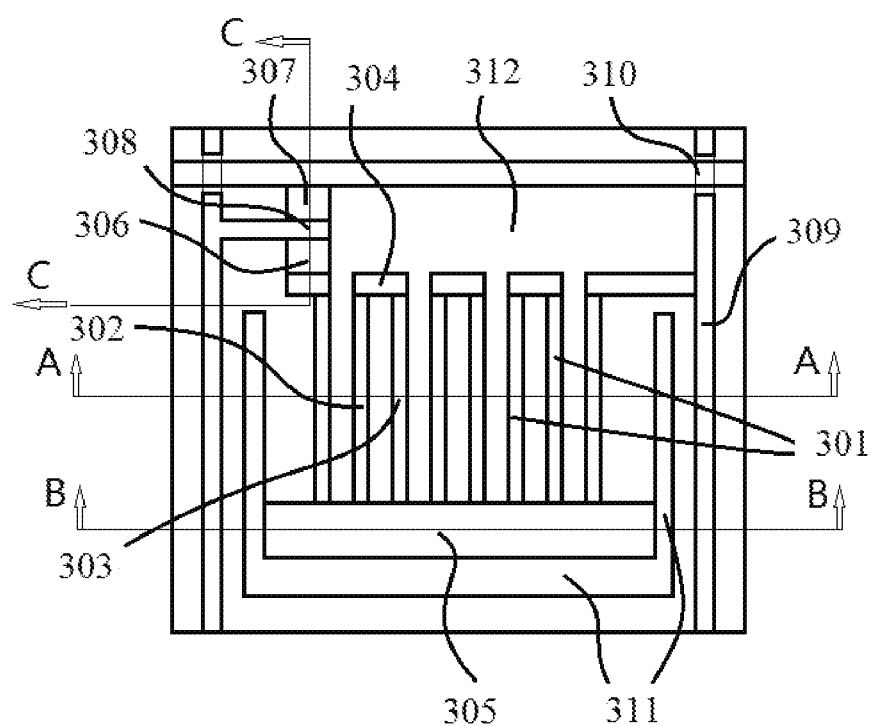
FIG. 3 shows a top view of a pixel of the said vacuum packaged infrared sensor array.

According to the present invention, the said individual infrared sensor pixel can be shown in the FIG. 3. The said individual infrared sensor pixel comprises a thermopile 301 consisting of several thermocouples each constructed by a p+ recrystallized amorphous silicon leg 302 and an n+ recrystallized amorphous silicon leg 303, an infrared absorber 305 disposed on the top of the hot junctions (not shown in the figure) of the said thermopile and resulting in a temperature different between the said hot junctions and the said cold junctions 304 of the said thermopile which disposed near the frame formed in a silicon substrate 312, a recrystallized amorphous silicon FET with a n+ polysilicon gate 308, an n+ recrystallized amorphous silicon source 307 and an n+ recrystallized amorphous silicon drain 306, a metal such as an aluminum interconnection 309, a buried p+ recrystallized amorphous silicon bridge 310 connecting the said interconnection, an etch gap 311 and the said frame surrounding a membrane which is used to arrange the said thermopile and the said infrared absorber thereon.

Figure 4:
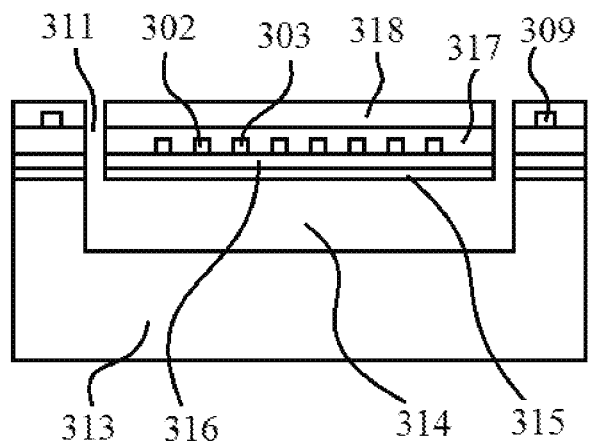
FIG. 4 shows a cross sectional view of the said pixel of the said vacuum packaged infrared sensor array taken from A-A cross section of the said FIG. 3.

FIG. 4 shows a cross sectional view of the said individual infrared sensor pixel taken from A-A of the said FIG. 3. In the FIG. 4, 302 indicates the said p+ recrystallized amorphous silicon leg, 303 indicates the said n+ recrystallized amorphous silicon leg, 309 indicates the said interconnection, 311 indicates the said etching gap, 313 indicates the said silicon substrate, 214 indicates a flat bottom cavity, 315 indicates a polysilicon layer, 316 indicates a silicon nitride layer, 317 indicates another polysilicon layer and 318 indicates another silicon nitride layer. It is to be noted that over the flat bottom cavity 314, there is a stack layer consisting of the said polysilicon layer 215, the said silicon nitride layer 316, the said another polysilicon layer 317 and the said silicon nitride layer 318 which are all stacked together to form a membrane suspending over the said flat bottom cavity 314.

Figure 5:
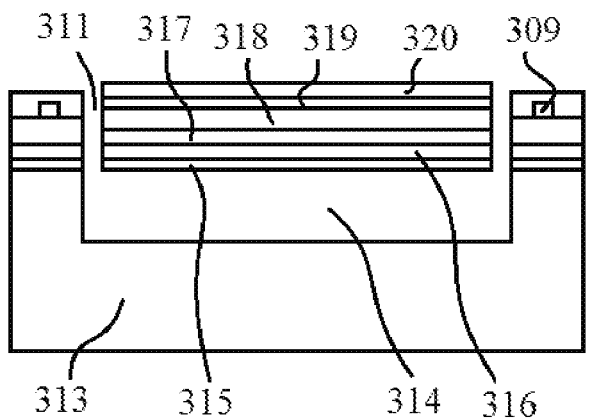
FIG. 5 shows a cross sectional view of the said pixel of the said vacuum packaged infrared sensor array taken from B-B cross section of FIG. 3.

FIG. 5 shows a cross sectional view of the said pixel of the said infrared sensor array taken from B-B of the FIG. 3. As shown in the FIG. 5, 309 indicates the said interconnection, 311 indicates the said etching gap, 313 indicates the said silicon substrate, 314 indicates the said flat bottom cavity, 315 indicates the said polysilicon layer, 316 indicates the said silicon nitride layer, 317 indicates the said another polysilicon layer, 319 indicates a titanium layer and 320 indicates the another silicon nitride layer. This figure is to show the structure of an infrared absorber which is a stack layer consisting of the said silicon nitride layer 320, the said titanium layer 319, the said silicon dioxide layer 318, the said another polysilicon layer 317, the said silicon nitride layer 316 and the said polysilicon layer 315 which is also suspending over the said flat bottom cavity 314.

Figure 6:
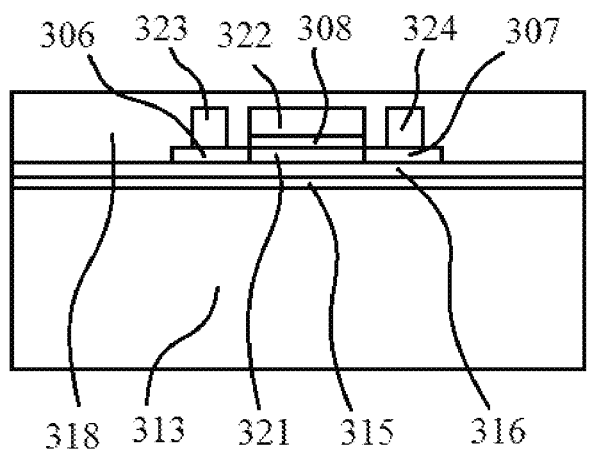
FIG. 6 shows a cross sectional view of the said pixel of the said vacuum packaged infrared sensor array taken from C-C cross section of FIG. 3.

FIG. 6 shows a cross sectional view of the pixel of the infrared sensor array taken from C-C of the FIG. 3. In the FIG. 6, 306 indicates the said n+ recrystallized amorphous silicon drain of the said EFT, 307 indicates the said n+ recrystallized amorphous silicon source of the said FET, 308 indicates the gate of the FET, 313 indicates the said silicon substrate, 315 indicated the said polysilicon layer, 316 indicates the said silicon nitride layer, 317 indicates the said another polysilicon layer, 321 indicates the gate of the said FET which is an undoped recrystallized amorphous silicon layer, 322 indicates the n+ polysilicon gate of the said FET, 323 indicates the drain electrode of the said FET and 324 indicates the source electrode of the said FET. It is to be noted that the said FET is made of the said recrystallized amorphous silicon. The said recrystallized amorphous silicon layers have electronic properties that closely approximate those of single crystal silicon. This result ultimately led to successful attempts to fabricate MOS transistors and integrated circuits directly in the said recrystallized amorphous silicon layers. A substantial interest now exists in the potential of the recrystallized silicon-on-insulators (SOIs) as a substrate for integrated circuit fabrication.

According to the present invention, the said silicon substrate can be any crystal orientations including a (111) crystal orientation which is not allowed to use for KOH micromachining. The KOH etch rate is strongly affected by the crystallographic orientation of the silicon (anisotropic). The (110) plane is the fastest etching primary surface. The (111) plane is an extremely slow etching plane that is tightly packed, has a single dangling-bond per atom, and is overall atomically flat. So it is impossible to create a flat bottom cavity in a silicon substrate with a (111) crystal.

The silicon micromachining technology used in the present invention is based on the selective forming and etching of a porous silicon layer in a silicon substrate. A porous silicon layer results from an electrochemical etching of a crystalline silicon substrate in a hydrofluoric acid based electrolyte. The growth rate of porous silicon depends on the type and the doping level, but not the crystallographic orientation of the silicon substrate. The electrolyte composition also influents the growth rate of porous silicon. Pores are grown mainly in the current direction. Their sizes vary from a few nanometers to several micrometers. The thickness of the porous silicon layer mainly depends on the applied current density and duration. So the depth of the cavity can be made in the range of 20 to 50 micron. The flat bottom cavity can be simply modeled as a one-dimensional heat conduction transfer from the said membrane to the said flat bottom.

The infrared sensor array is preferred to be fabricated using a conventional CMOS process. This process is the normal technique used to manufacture typical integrated circuits. Several key benefits to leveraging conventional CMOS processing for MEMS are that fabrication is fast, reliable, repeatable, and economical.

Many thin layers are available in the CMOS process. The type of the thin layers includes silicon dioxide ($SiO_2$), silicon nitride ($Si_3N_4$), polysilicon, amorphous silicon layer, recrystallized amorphous silicon, metals such as titanium, tungsten and aluminum. All these thin layers can be chosen according to the equipments of the present invention.

The said thermopile is fabricated from recrystallized amorphous silicon that ensures sufficiently high thermopower while their conductivity and thermo-power can be adjusted by the proper doping. Individual thermocouple is constructed by a recrystallized p-type such as boron doped polysilicon leg and a recrystallized n-type such as phosphorus doped polysilicon leg. Due to recrystallization of amorphous silicon resulting in larger grain size, the thermopile has a low resistance so as to have a low thermal noise or Johnson-Nyquist noise. The thermopile can be integrated more than 30 thermocouples which still has quite low thermal noise.

The said membrane is built by a stack layer consisting of at least a silicon dioxide layer and a silicon nitride layer or both two layers. Silicon dioxide material and silicon nitride material have high electrical resistivity and low thermal conduction, which make them materials of choice for thermal membrane sensors where minimal losses of the said infrared sensor arrays are required.

The said infrared absorber is built by a stack layer consisting of a top silicon nitride layer, a titanium layer, a silicon dioxide layer, a recrystallized amorphous silicon layer, a silicon dioxide layer and a bottom polysilicon layer. The absorptance of the stack layer can be calculated based on the Fresnel equations. Like other metals, the said titanium layer has a complex index of refraction. This is because metals have free charge carriers that can oscillate in response to an incoming electromagnetic field. When the refractive index is complex, the imaginary part is sometimes called extinction coefficient. The extinction coefficient is larger, the more quickly light gets absorbed as it tries to travel through the material.

Many experiments showed that recrystallized amorphous silicon has electronic properties that closely approximate those of single crystal material. These results led the present invention to fabricate field effect transistors (FET's) and integrated circuits directly in recrystallized amorphous silicon. The recrystallized amorphous silicon can be realized by low temperature furnace annealing. As an alternative, the recrystallized amorphous silicon can be realized by laser annealing.

According to the present invention a method for fabricating a vacuum packaged infrared sensor array comprising two stages: preparing an infrared sensor array silicon substrate and preparing a lid silicon substrate, wherein the said preparing of an infrared sensor array silicon substrate comprises the following fabrication steps: providing a p-type silicon substrate; creating a 200 to 300 nm thick silicon nitride HF resistive mask pattern by low temperature vapor chemical deposition (LPCVD) and conducting a photolithography process; conducting anodization in a HF solution to grow a 20 to 50 µm thick porous silicon layer in said silicon substrate; conducting low temperature oxidization of the said porous silicon layer at 350° C. in oxygen for 30 min; removing the residue silicon nitride layer by etching; depositing both a 100 nm thick polysilicon layer and a 500 nm thick silicon nitride layer over the surface of the said silicon substrate by plasma enhanced chemical vapor deposition (PECVD); depositing a 100 to 200 nm thick amorphous silicon layer over the surface of the said silicon substrate by LPCVD at 475° C.; pattering the said amorphous silicon layer to create an amorphous silicon active area for a thermopile, an amorphous silicon active area for a field-effect transistor (FET) and an amorphous silicon active area for several buried amorphous silicon interconnection bridges by a photolithography process; conducting recrystallization of the said amorphous silicon active areas to form recrystallized amorphous silicon active areas with larger grain size; conducting thermal oxidization of the said recrystallized amorphous silicon areas to grow a 70-100 nm thick silicon dioxide layer on the said recrystallized amorphous silicon active areas; depositing a 300 nm polysilicon layer by LPCVD over the surface of the said silicon substrate at 650° C.; pattering the said polysilicon layer to create a polysilicon element for an infrared absorber and a polysilicon gate for the FET by photolithography process; conducting n+ such as phosphorus ion implantation to form n+ recrystallized amorphous silicon legs for the thermopile, a n+ recrystallized amorphous silicon drain, a n+ recrystallized amorphous silicon source and a n+ polysilicon gate for the FET; conducting p+ such as boron ion implantation to form p+ recrystallized amorphous silicon legs for the thermopile and p+ recrystallized amorphous silicon interconnection bridges; annealed at 950° C. in nitrogen for 30 min; depositing a 1100 nm silicon dioxide layer by PECVD; conducting a photolithography process; conducting a plasma passivation treatment on the n+ recrystallized amorphous silicon drain and source of the said FET; depositing a 200 nm thick titanium layer and conducting a photolithography process; depositing a 1000 nm thick aluminum layer by sputtering and conducting a photolithography process; depositing a 850 nm thick high density plasma (HDP) silicon nitride layer over the surface of the said silicon substrate; producing a seal ring consisting of Ti/Pt/Au on the round edge of the said infrared sensor array; creating an etching window in the said HDP silicon nitride layer down to the said porous silicon layer; etching the said porous silicon layer in a diluted KOH solution to create a cavity replacing the said porous silicon layer and release the stack layer over the said porous silicon layer which results in a membrane over the said cavity and finally finish the fabrication process of the said infrared sensor array silicon substrate and the said preparing of a lid silicon substrate comprises the following fabrication steps: providing a lid silicon substrate; growing a 20 to 50 µm thick central porous silicon layer and a 20 to 50 µm thick edge porous silicon layer in an area sized equal to the said infrared sensor array; creating a seal ring consisting of Ti/Pt/Au/Ge/Au on the round edge of the said central porous silicon layer; removing Si—H species on the pore walls of the said porous silicon layers by heating up to 350° C. in vacuum; loading the said infrared sensor array silicon substrate and the said lid substrate into a vacuum bonding system; before bonding the said vacuum system is pumped from an atmosphere to vacuum and then filled with oxygen back to the atmosphere for 2 to 3 times; conducting eutectic bonding of the said lid silicon substrate and the said sensor silicon substrate in vacuum at 350° C. to 450° C. so as to oxidize the said porous silicon layers and consume the residue oxygen in the chamber sandwiched between the said lid silicon substrate and the said infrared sensor array silicon substrate; cutting the said lid silicon substrate down to the said edge porous silicon layer; etching the said edge porous silicon layer and etching the said HDP silicon nitride layer to real the said aluminum bon pads so as to finish the fabrication process for the said vacuum packaged only silicon substrate infrared sensor array.

Figure 7:
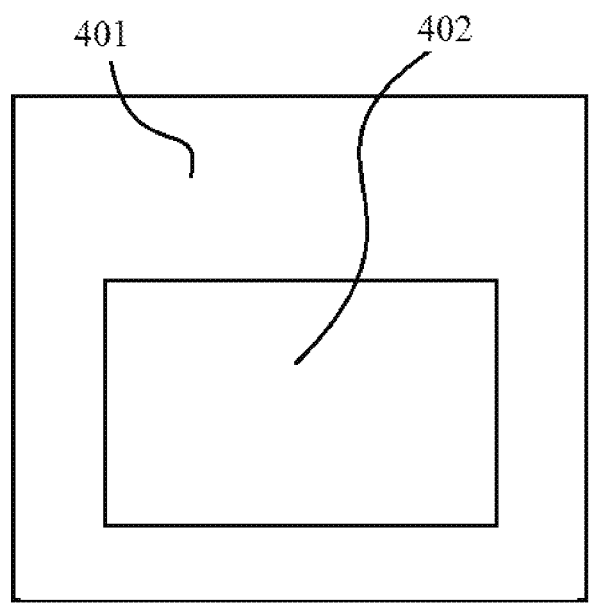
FIG. 7 shows a top view of an infrared sensor pixel of an infrared sensor array silicon substrate created by a first several steps of the process for fabricating a vacuum packaged infrared sensor array.

After a first several fabrication steps, the top view of a pixel of an infrared sensor array is shown in the FIG. 7. The first several fabrication steps include: preparing a p-type silicon substrate; creating a 200 to 300 nm thick silicon nitride HF resistive mask pattern by low temperature vapor chemical deposition (LPCVD) and conducting a photolithography process; conducting anodization in a HF solution to grow a 20 to 50 µm thick porous silicon layer in said silicon substrate; conducting low temperature oxidization of the said porous silicon layer at 350° C. in oxygen for 30 min; removing the said residue silicon nitride layer by etching. In the FIG. 7, 401 indicates the said silicon substrate, 402 indicates the said porous silicon layer recessed into the said silicon substrate and formed in a restricted region of the said silicon substrate using the said anodization mask (not shown in the figure).

The said silicon substrate can be any crystal orientation silicon substrate including a (111) crystal orientation silicon substrate which is not allowed to use for KOH micromachining.

The said porous silicon layer is used as a sacrificial layer for micromachining so as to create a deep cavity into the silicon substrate with a very smooth bottom surface and four curved sidewalls.

The said etching of the P-type silicon substrate is conducted in a HF solution consisting of 49 wt. % HF in water and ethanol, having a HF concentration ranging from 12 to 35 vol % and at an anodic current density ranging from 20 mA to 80 mA/cm$^2$.

The said porous silicon layer is designed to have a depth ranging from 20 to 50 μm and a top surface size ranging from 100×100 to 500×500 (μm)$^2$.

Figure 8:
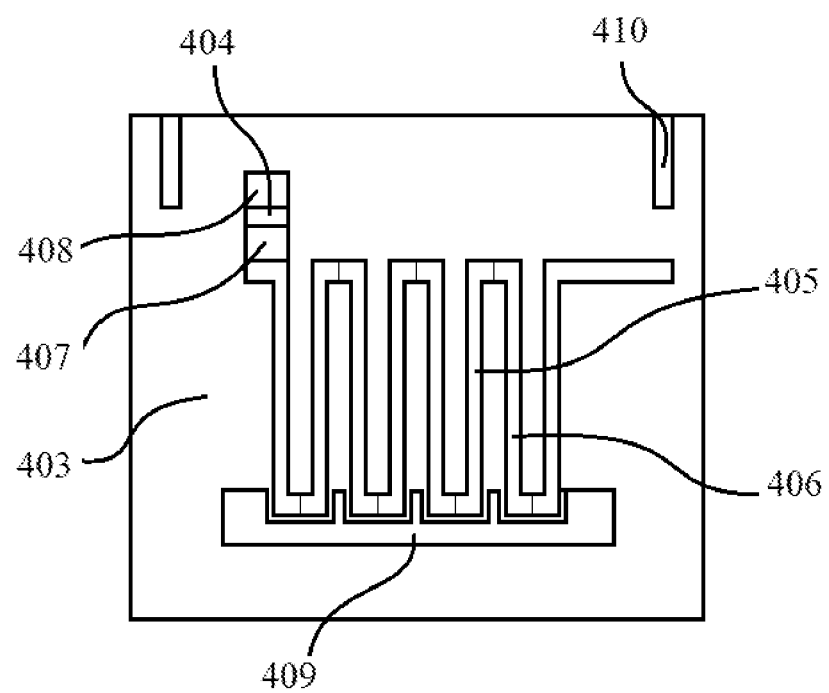
FIG. 8 shows a top view of the said infrared sensor pixel of the said infrared sensor array silicon substrate created by a second several steps of the said process for fabricating the said vacuum packaged infrared sensor array.

After a second several fabrication steps, the top view of the said pixel of the said infrared sensor array can be shown in the FIG. 8. The second several fabrication steps include: depositing both a bottom 100 nm thick polysilicon layer and a top 500 nm thick silicon nitride layer 403 over the surface of the said silicon substrate by plasma enhanced chemical vapor deposition (PECVD); then depositing a 100 to 200 nm thick amorphous silicon layer over the surface of the said silicon substrate by LPCVD at 475° C.; pattering the said amorphous silicon layer to create an amorphous silicon active area for a thermopile, an amorphous silicon active area for a field-effect transistor (FET) and an amorphous silicon active area for buried amorphous silicon interconnection bridges by photolithography process; conducting recrystallization of the said amorphous silicon active areas to form recrystallized amorphous silicon active areas with larger grain size; conducting thermal oxidization of the said recrystallized amorphous silicon active areas to grow a 70-100 nm thick silicon dioxide layer on the said recrystallized amorphous silicon active areas; depositing a 300 nm polysilicon by LPCVD over the surface of the said silicon substrate at 650° C.; pattering the said polysilicon layer to create a polysilicon element 409 for an infrared absorber and a polysilicon active area for the FET by photolithography process; conducting n+ such as phosphorus ion implantation to form n+ recrystallized amorphous silicon legs 405 for the thermopile, a n+ recrystallized amorphous silicon drain 407, a n+ recrystallized amorphous silicon source 408 and a n+ polysilicon gate 404 for the FET; conducting p+ such as boron ion implantation to form p+ recrystallized amorphous silicon legs 406 for the thermopile and p+ recrystallized amorphous silicon interconnection bridges 410; then annealed at 950° C. in N$_2$ for 30 min.

The said recrystallization of the said amorphous silicon layer is realized by rapid thermal annealing at 750° C. for 120 s or at 550° C. for 60 s and then at 750° C. for 60 s.

The said recrystallization of the said amorphous silicon layer is realized by laser annealing such as KrF or XeCl excimer laser annealing, which supply intense pulsed light with durations of approximately 30 to 50 ns.

The said recrystallization of the amorphous silicon layer is realized by low thermal furnace annealing such as in vacuum at 600° C. for 10 to 14 hours.

The said ion implantation for the said FET is self-alignment so that the n+ ion implanted is applied only for the said recrystallized silicon drain area and the said recrystallized silicon source area but not for the said recrystallized silicon gate area.

The said p+ and n+ recrystallized amorphous silicon layers have a carrier concentration ranging from 2×10$^{15}$ to 5×10$^{15}$/cm$^2$, respectively.

The said plasma passivation on the said n+ recrystallized amorphous silicon drain and source of the said FET is realized by H$_2$ plasma treatment in a parallel-plate plasma reactor at 300° C. with a power density of 0.7 W/cm$^2$.

The said plasma passivation on the said n+ recrystallized amorphous silicon drain and source of the said FET is realized by NH$_3$ plasma treatment in a parallel-plate plasma reactor at 300° C. with a power density of 0.7 W/cm$^2$.

The said recrystallization of the amorphous silicon layers has low electrical resistivity because the annealing can reduce the resistivity by a factor of at least 2-3 compared to the original electrical resistivity.

Figure 9:
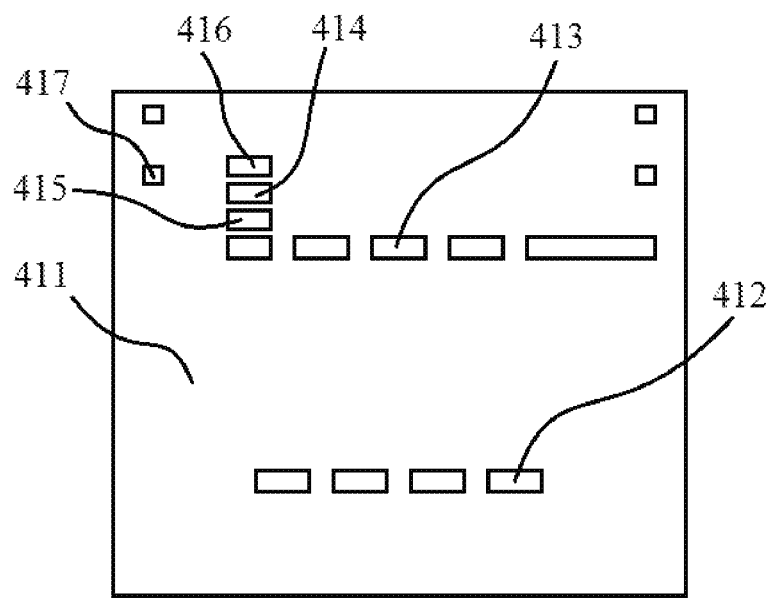
FIG. 9 shows a top view of the said infrared sensor pixel of the said infrared sensor array silicon substrate created by a third several steps of the said process for fabricating the said vacuum packaged infrared sensor array.

After a third several fabrication steps, the top view of the said pixel of the said infrared sensor array can be shown in the FIG. 9. The third several fabrication steps include: depositing an 1100 nm silicon dioxide layer by PECVD over the surface of the said silicon substrate; conducting a photolithography process to create a silicon dioxide layer; conducting a plasma passivation treatment on the said n+ recrystallized amorphous silicon drain and on the said n+ recrystallized amorphous silicon source of the said FET.

In the FIG. 9, 411 indicates the said silicon dioxide layer, 412 indicates several opens in the said silicon dioxide layer for forming the electrodes of the cold junctions of the said thermopile, 413 indicates several opens in the said silicon dioxide layer for forming the electrodes of the hot junctions of the said thermopile, 414 indicates an open in the said silicon dioxide layer for forming the electrode of the said silicon dioxide gate of the said FET, 415 indicates an open in the said silicon dioxide layer for forming the electrode of the said n+ recrystallized amorphous silicon drain of the said FET, 416 indicates an open in the silicon dioxide layer for forming the electrode of the said n+ recrystallized amorphous silicon source of the said FET and 417 indicates several opens in the said silicon dioxide layer for forming the electrodes of the said buried p+ recrystallized amorphous silicon bridges.

Figure 10:
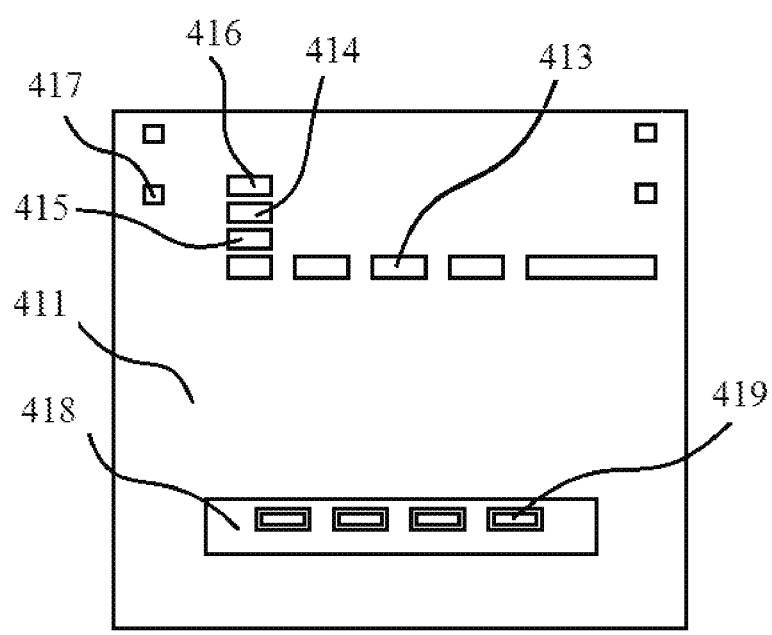
FIG. 10 shows a top view of the said infrared sensor pixel of the said infrared sensor array silicon substrate created by a fourth several steps of the said process for fabricating the said vacuum packaged infrared sensor array.

After a fourth several fabrication steps, the top view of the said pixel of the said infrared sensor array can be shown in the FIG. 10. The fourth several fabrication steps include: depositing a 200 nm thick titanium layer and conducting a photolithography process for pattering the said titanium layer.

In the FIG. 10, 411 indicates the said silicon dioxide layer, 418 indicates the said titanium layer used as an element of the said infrared absorber and 419 indicates the said titanium layer partially filled into the said opens to form the electrode connecting to the said hot junctions of the said thermopile.

Figure 11:
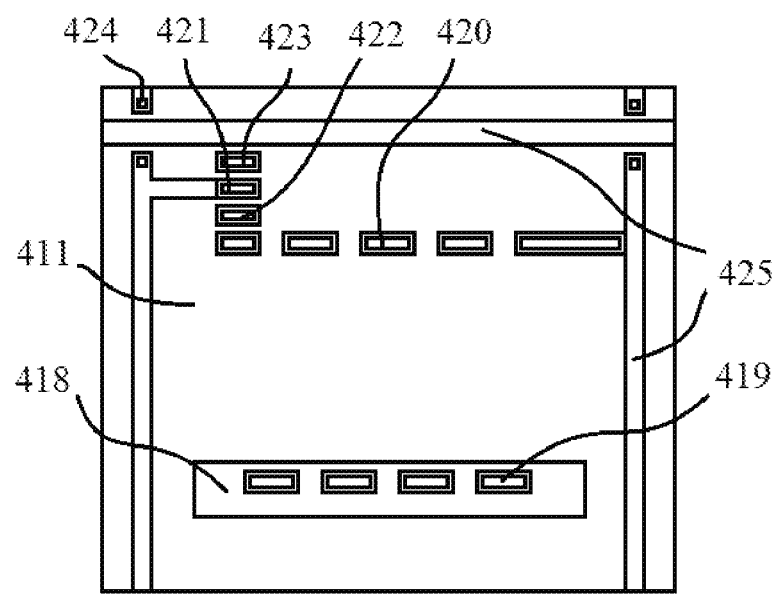
FIG. 11 shows a top view of the said infrared sensor pixel of the said infrared sensor array silicon substrate created by a fifth several steps of the said process for fabricating the said vacuum packaged infrared sensor array.

After a fifth several fabrication steps, the top view of the said pixel of the said infrared sensor array can be shown in the FIG. 11. The fifth several fabrication steps include: depositing a 1000 nm thick aluminum layer by sputtering and conducting a photolithography process for pattering the said aluminum layer.

In the FIG. 11, 411 indicates the said silicon dioxide layer, 420 indicates several aluminum electrodes connecting to the cold junction of the said thermopile, 421 indicates an aluminum electrode connecting to the said silicon dioxide gate of the said FET, 422 indicates the aluminum electrode connecting to the said n+ recrystallized amorphous silicon drain of the said FET, 423 indicates the aluminum electrode connecting to the said n+ recrystallized amorphous silicon source of the said FET, 424 indicates several aluminum electrodes connecting to the said buried p+ recrystallized amorphous silicon bridges and 425 indicates the said aluminum interconnection.

Figure 12:
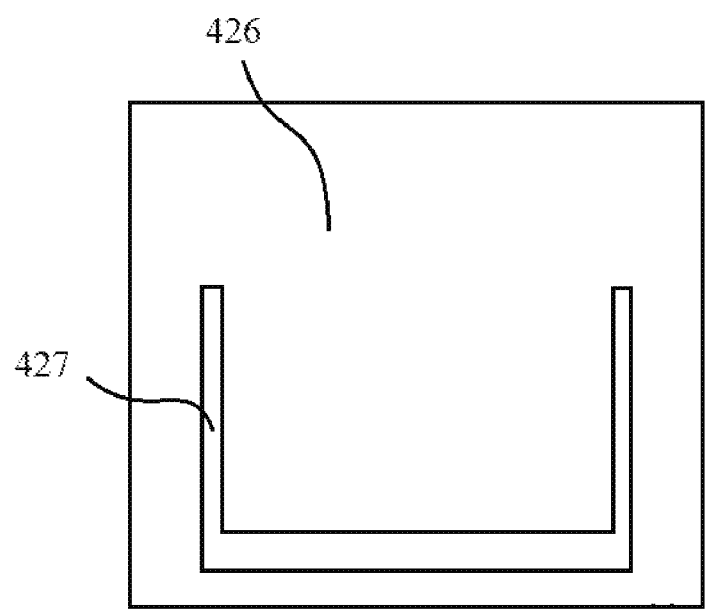
FIG. 12 shows a top view of the said infrared sensor pixel of the said infrared sensor array silicon substrate created by a sixth several steps of the said process for fabricating the said vacuum packaged infrared sensor array.

After a sixth several fabrication steps, the top view of the said pixel of the said infrared sensor array can be shown in the FIG. 12. The sixth several fabrication steps include: depositing a 850 nm thick HDP silicon nitride layer indicated by 426; creating an etching window indicated by 427 in the said HDP silicon nitride layer to reveal the said porous silicon layer; etching the said porous silicon layer in a diluted KOH solution to create a flat bottom cavity replacing the said porous silicon layer and release the stack layer over the said porous silicon layer which results in a suspending thin membrane and finally finish the said fabrication process.

As can be seen from the FIG. 7 to the FIG. 12, the said finished infrared sensor array comprises the said infrared absorber, the said membrane and the said FET. The said infrared absorber is a stack layer consisting of the said 850 nm thick silicon nitride layer, the said 200 nm thick titanium layer, the said 1100 nm thick silicon dioxide layer, the said 500 nm thick nitride layer and the said 100 nm thick polysilicon layer. The absorptance of the said stack layer can be calculated based on the complex-matrix form of the Fresnel equations and the calculated absorptance is 86% at 9.6 μm wavelength. The said membrane also is a stack layer mainly consisting of the said 860 nm thick silicon nitride layer, the said 1100 nm thick silicon dioxide layer, the said 500 nm thick silicon nitride layer and the said 100 nm thick polysilicon layer. The said FET is made of the said recrystallized amorphous silicon and the said recrystallized amorphous silicon for the drain and the source of the said FET is n-type doped and for the gate is undoped. After NH3 plasma passivation treatment the said FET has higher carrier mobility and lower threshold voltage which are required by the present invention.

Figure 13:
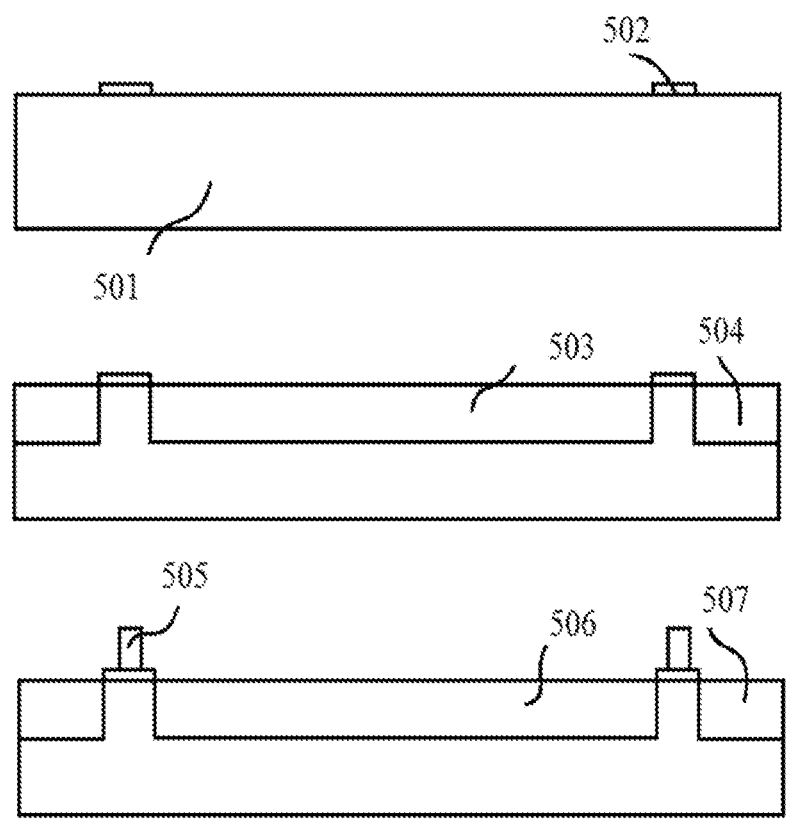
FIG. 13 shows a process for preparing a lid silicon substrate for fabricating the said vacuum packaged infrared sensor array: (A) a HF resistance mask pattern created on the surface of a silicon substrate; (B) a central and an edge porous silicon layers grown in the said silicon substrate; (C) an eutectic ring created around the said central porous silicon layer.

FIG. 13 shows a process for preparing the said lid silicon substrate. The said process comprises three steps. As shown in the FIG. 12A, a silicon substrate 501 has an anodization mask 502 on the surface of the said lid silicon substrate, wherein the said anodization mask is preferred to be made of a silicon nitride layer. As shown in the FIG. 12C, the said lid silicon substrate is anodized in a HF solution to form a central porous silicon layer 503 and an edge porous silicon layer 504. As shown in the FIG. 12C, a eutectic ring 505 is produced around the said central porous silicon layer. Then the said lid silicon substrate is heated up to 350° C. in vacuum for 30 to 60 min so as to remove Si—H species on the pore walls of the said porous silicon layers.

Figure 14:
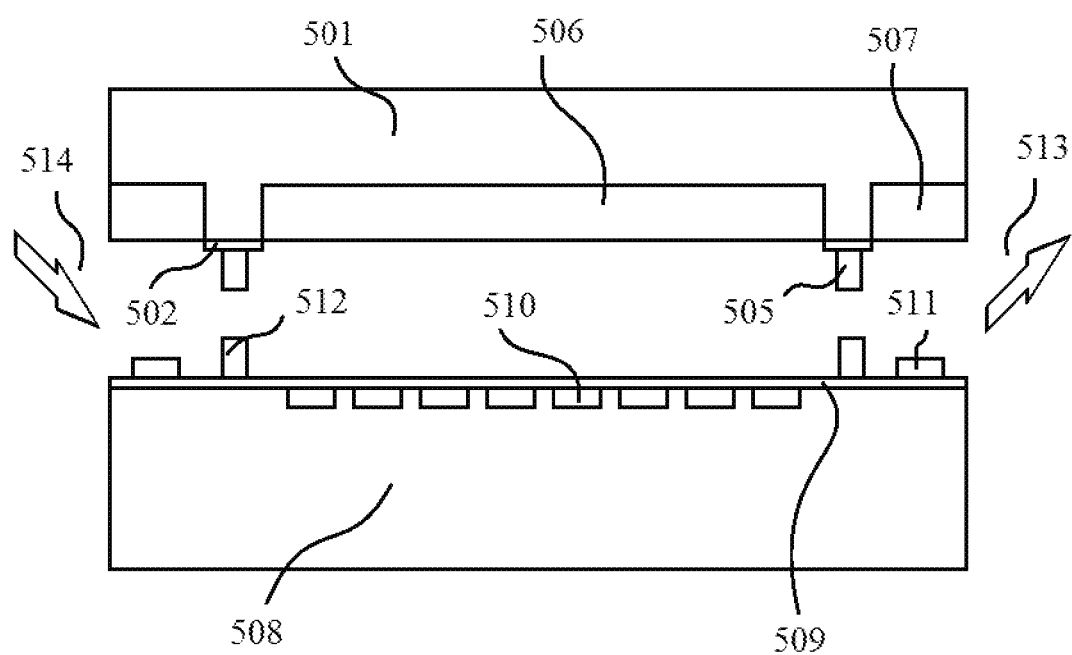
FIG. 14 shows a cross sectional view of the said infrared sensor array silicon substrate and the said lid silicon substrate loaded in a vacuum packaging system for conducting pre-bonding treatments.

FIG. 14 shows a cross sectional view of the said infrared sensor array silicon substrate and the said lid silicon substrate both loaded in a vacuum bonding system. In the FIG. 14, 501 indicates the said lid silicon substrate, 502 indicates a silicon nitride layer, 505 indicates the said eutectic ring on the said lid silicon substrate, 506 indicates a Si—H species removed central porous silicon layer, 507 indicates a Si—H species removed edge porous silicon layer, 508 indicates the said infrared sensor array silicon substrate, 509 indicates a silicon nitride layer on the said infrared sensor array silicon substrate, 510 indicates a pixel of the said infrared sensor array, 511 indicates a bond pad on the said infrared sensor array silicon substrate, 512 indicates a eutectic ring on the said infrared sensor array silicon substrate, 513 indicates an air flow pumped out of the said vacuum bonding system and 514 indicates an oxygen flow filled into the said vacuum bonding system.

Before bonding, the said porous silicon layers need to be treated 2 to 3 cycles by vacuuming and filling of the said vacuum bonding system so that the residual gas in the pores of the said porous silicon layers is only oxygen and absolutely no hydrogen and nitrogen. In the first time, the air filled in the said bonding system is pumped out and the next two to three times, the oxygen filled in the said bonding system is pumped out.

Figure 15:
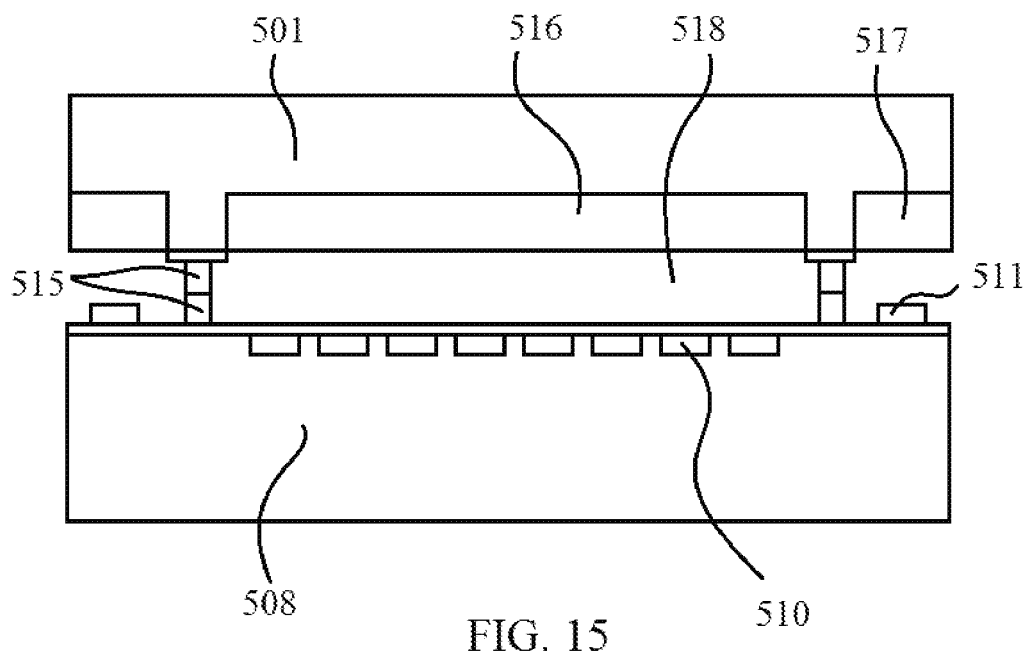
FIG. 15 shows a cross sectional view of the said two silicon substrates bonded at 350 to 450° C. resulting an enhanced vacuum in the said vacuum packaged infrared sensor array.

FIG. 15 shows a cross sectional view of the said infrared sensor array silicon substrate and the said lid silicon substrate both bonded together in the said vacuum bonding system. In the FIG. 15, 515 indicates the bonded two eutectic ring, 516 indicates a low temperature oxidized central porous silicon layer, 517 indicates a low temperature oxidized edge porous silicon layer and 518 indicates an enhanced vacuum in the chamber sandwiched by the said infrared sensor array silicon substrate and the said lid silicon substrate which is sealed by the said bonded two eutectic rings.

Bonding of the said lid silicon substrate and the said infrared sensor array silicon substrate is conducted in the said vacuum bonding system at 350 to 450° C. and for 30 to 60 min. During the bonding process, the said porous silicon layers are oxidized to form a continuous thin oxide layer on the pore walls of the said porous silicon layers which led to consume the residual oxygen completely in the said sealed chamber sandwiched by the two said silicon substrates so as to increases the vacuum in the said sealed chamber.

Figure 16:
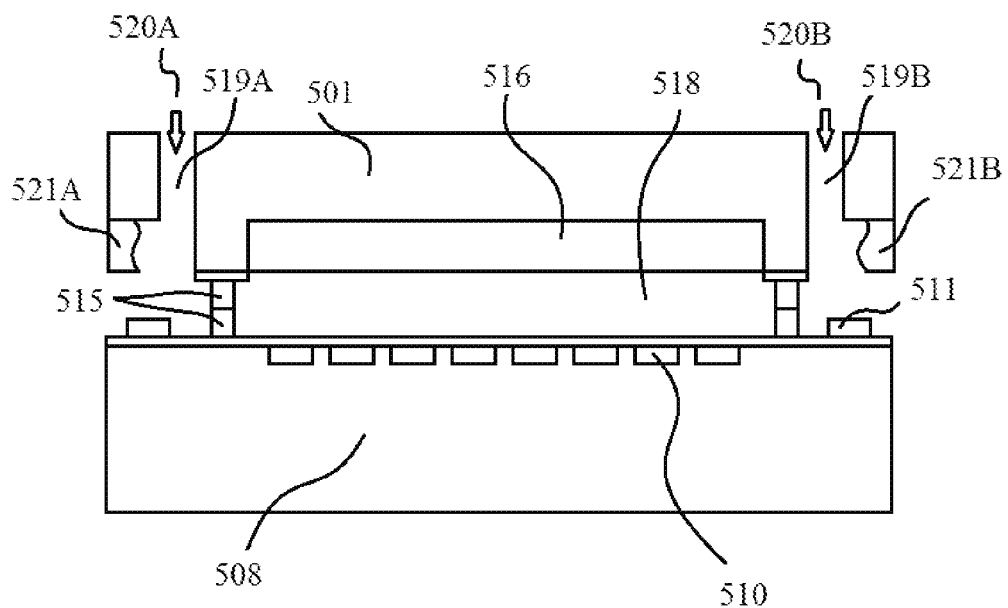
FIG. 16 shows a process for etching the said edge porous silicon layer of the said lid silicon substrate and revealing the said bond pads of the said infrared sensor array.

FIG. 16 shows a cross sectional view of a finished vacuum packaged infrared sensor array. In the FIG. 16, 519A and 519B indicate a cutting groove from the top surface of the said lid silicon substrate down to the said oxidized edge porous silicon layer, 520A and 520B indicate a diluted KOH solution flowing into the said cutting groove and 521A and 521B indicate an etched oxidized edge porous silicon layer. After etching the said edge oxidized porous silicon layer and the said HDP silicon nitride layer the said aluminum bond pads around the said infrared sensor array are revealed. At this point, the said vacuum packaged infrared sensor array has been constructed in final. It is worth to be noted that the vacuum in the chamber sandwiched by the said lid silicon substrate and the said infrared sensor array silicon substrate is much enhanced by low temperature oxidization of the said central porous silicon layer. During low temperature oxidization the residual oxygen in the said chamber is consumed to form the silicon dioxide layer on the pore walls of the said central porous silicon layer. As a result, the vacuum in the said chamber is much increased and therefore the packed infrared sensor array can operated in a very high vacuum environment and an extremely excellent performance of the said packed infrared sensor array can be realized.

Only a preferred embodiment of the invention has been shown and described. It should be understood that the invention is not limited to the embodiment disclosed, but is intended to embrace any alternative, modification, rearrangements, or substitutes of parts or elements as fall within the spirit and scope of the invention.

What is claimed is:

1. A method for fabricating a vacuum packaged infrared sensor array comprising two stages: preparing an infrared sensor array silicon substrate and preparing a lid silicon substrate, wherein the said preparing of an infrared sensor array silicon substrate comprises the following fabrication steps: providing a p-type silicon substrate; creating a 200 to 300 nm thick silicon nitride HF resistive mask pattern by low temperature vapor chemical deposition (LPCVD) and conducting a photolithography process; conducting anodization in a HF solution to grow a 20 to 50 μm thick porous silicon layer in said silicon substrate; conducting low temperature oxidization of the said porous silicon layer at 350° C. in oxygen for 30 min; removing the residue silicon nitride layer by etching; depositing both a 100 nm thick polysilicon layer and a 500 nm thick silicon nitride layer over the surface of the said silicon substrate by plasma enhanced chemical vapor deposition (PECVD); depositing a 100 to 200 nm thick amorphous silicon layer over the surface of the said silicon substrate by LPCVD at 475° C.; patterning the said amorphous silicon layer to create an amorphous silicon active area for a thermopile, an amorphous silicon active area for a field-effect transistor (FET) and an amorphous silicon active area for several buried amorphous silicon interconnection bridges by a photolithography process; conducting recrystallization of the said amorphous silicon active areas to form recrystallized amorphous silicon active areas with larger grain size; conducting thermal oxidization of the said recrystallized amorphous silicon areas to grow a 70-100 nm thick silicon dioxide layer on the said recrystallized amorphous silicon active areas; depositing a 300 nm polysilicon layer by LPCVD over the surface of the said silicon substrate at 650° C.; patterning the said polysilicon layer to create a polysilicon element for an infrared absorber and a polysilicon gate for the FET by photolithography process; conducting n+ such as phosphorus ion implantation to form n+ recrystallized amorphous silicon legs for the thermopile, a n+ recrystallized amorphous silicon drain, a n+ recrystallized amorphous silicon source and a n+ polysilicon gate for the FET; conducting p+ such as boron ion implantation to form p+ recrystallized amorphous silicon legs for the thermopile and p+ recrystallized amorphous silicon interconnection bridges; annealed at 950° C. in nitrogen for 30 min; depositing a 1100 nm silicon dioxide layer by PECVD;

conducting a photolithography process; conducting a plasma passivation treatment on the recrystallized amorphous silicon drain and source of the said FET; depositing a 200 nm thick titanium layer and conducting a photolithography process; depositing a 1000 nm thick aluminum layer by sputtering and conducting a photolithography process; depositing a 850 nm thick high density plasma (HDP) silicon nitride layer over the surface of the said silicon substrate; producing a seal ring consisting of Ti/Pt/Au on the round edge of the said infrared sensor array; creating an etching window in the said HDP silicon nitride layer down to the said porous silicon layer; etching the said porous silicon layer in a diluted KOH solution to create a cavity replacing the said porous silicon layer and release the stack layer over the said porous silicon layer which results in a membrane over the said cavity and finally finish the fabrication process of the said infrared sensor array silicon substrate and the said preparing of a lid silicon substrate comprises the following fabrication steps: providing a lid silicon substrate; growing a 20 to 50 μm thick central porous silicon layer and a 20 to 50 μm thick edge porous silicon layer in an area sized equal to the said infrared sensor array; creating a seal ring consisting of Ti/Pt/Au/Ge/Au on the round edge of the said central porous silicon layer; removing Si—H species on the pore walls of the said porous silicon layers by heating up to 350° C. in vacuum; loading the said infrared sensor array silicon substrate and the said lid substrate into a vacuum bonding system; before bonding the said vacuum system is pumped from an atmosphere to vacuum and then filled with oxygen back to the atmosphere for 2 to 3 times; conducting eutectic bonding of the said lid silicon substrate and the said sensor silicon substrate in vacuum at 350° C. to 450° C. so as to oxidize the said porous silicon layers and consume the residue oxygen in the chamber sandwiched between the said lid silicon substrate and the said infrared sensor array silicon substrate; cutting the said lid silicon substrate down to the said edge porous silicon layer; etching the said edge porous silicon layer and etching the said HDP silicon nitride layer to real the said aluminum bon pads so as to finish the fabrication process for the said vacuum packaged only silicon substrate infrared sensor array.

2. A method for fabricating a vacuum packaged infrared sensor array as claimed in claim 1, wherein the said infrared sensor array silicon substrate and the said lid silicon substrate can be any crystal orientation silicon substrate including a (111) crystal orientation silicon substrate which is not allowed to use for KOH micromachining.

3. A method for fabricating a vacuum packaged infrared sensor array as claimed in claim 1, wherein the said porous silicon layer in the said infrared sensor array silicon substrate is used as a sacrificial layer for micromachining so as to create a cavity in the said infrared sensor array silicon substrate with a flat bottom.

4. A method for fabricating a vacuum packaged infrared sensor array as claimed in claim 1, wherein the said 100 to 200 nm thick amorphous silicon is deposited by low temperature chemical vapor deposition (LPCVD) at or lower 550° C.

5. A method for fabricating a vacuum packaged infrared sensor array as claimed in claim 1, wherein the etching of the P-type silicon substrate is conducted in a HF solution consisting of 49 wt. % HF in water and ethanol, having a HF concentration ranging from 12 to 35 vol % and at an anodic current density ranging from 20 mA to 80 mA/cm$^2$.

6. A method for fabricating a vacuum packaged infrared sensor array as claimed in claim 1, wherein the thickness and the size of the said porous silicon layer are ranging from 20 to 50 μm and ranging from 100×100 to 500×500 μm$^2$ respectively.

7. A method for fabricating a vacuum packaged infrared sensor array as claimed in claim 1, wherein the recrystallization of an amorphous silicon layer is realized by using laser annealing so as to form the said recrystallized silicon layer.

8. A method for fabricating a vacuum packaged infrared sensor array as claimed in claim 1, wherein the recrystallization of an amorphous silicon layer is realized by using a thermal furnace annealing so as to form the said recrystallized silicon layer.

9. A method for fabricating a vacuum packaged infrared sensor array as claimed in claim 1, wherein the said doped p-type and the said n-type recrystallized amorphous silicon layers have a carrier concentration ranging from $2 \times 10^{15}$ to $5 \times 10^{15}$/cm$^2$.

10. A method for fabricating a vacuum packaged infrared sensor array as claimed in claim 1, after forming the said recrystallized silicon layer, a 70 to 100 nm thick silicon dioxide layer is thermally grown by dry oxidation.

11. A method for fabricating a vacuum packaged infrared sensor array as claimed in claim 1, wherein the plasma passivation on recrystallized amorphous silicon FET is done by H$_2$ plasma treatment in a parallel-plate plasma reactor at 300° C. with a power density of 0.7 W/cm$^2$.

12. A method for fabricating a vacuum packaged infrared sensor array as claimed in claim 1, wherein as an alternative the plasma passivation on recrystallized amorphous silicon FET is done by NH$_3$ plasma treatment in a parallel-plate plasma reactor at 300° C. with a power density of 0.7 W/cm$^2$.

13. A method for fabricating a vacuum packaged infrared sensor array as claimed in claim 1, wherein the said amorphous silicon layer has low electrical resistivity since the annealing reduces the resistivity by a factor of at least 2-3 compared to the original electrical resistivity.

14. A method for fabricating a vacuum packaged infrared sensor array as claimed in claim 1, wherein the said membrane is a stack layer comprising of a top silicon nitride layer, partial aluminum layer, partial recrystallized amorphous silicon layer, a silicon dioxide layer and a bottom polysilicon layer.

15. A method for fabricating a vacuum packaged infrared sensor array as claimed in claim 1, wherein the said infrared absorber is a stack layer comprising of a top silicon nitride layer, a metal layer, a silicon dioxide layer, a recrystallized amorphous silicon layer, a silicon nitride layer and a bottom polysilicon layer.

16. A method for fabricating a vacuum packaged infrared sensor array as claim in claim 1, wherein the said lid silicon substrate with the said central porous silicon layer and the said edge porous silicon layer is heated to 350° C. for desorbing and removing Si—H species on the pore walls of the porous silicon layers in a vacuum system.

17. A method for fabricating a vacuum packaged infrared sensor array as claimed in claim 1, wherein before the bonding of the said lid silicon substrate and the said sensor array silicon substrate the porous silicon layers needs to be treated by pumping and subsequent oxygen filling for 2 to 3 times in a vacuum bonding system so that the residual gas in the pores of the said porous silicon layers is only oxygen.

18. A method for fabricating a vacuum packaged infrared sensor array as claimed in claim 1, wherein the bonding of the said lid silicon substrate and the said infrared sensor array silicon substrate is conducted in a vacuum bonding system at 350 to 450° C. for 30 to 60 min.

19. A method for fabricating a vacuum packaged infrared sensor array as claimed in claim 1, wherein during the bonding of the said lid silicon substrate and the said infrared sensor array silicon substrate the said porous silicon layers are oxidized to form a continuous thin oxide layer on the pore walls of the said porous silicon layers resulting in consuming the residual oxygen in the said sealed chamber so as to increases the vacuum in the said sealed chamber.

* * * * *